United States Patent [19]

Ito

[11] 4,181,204
[45] Jan. 1, 1980

[54] OIL PRESSURE CONTROL MEANS FOR AN AUTOMATIC TRANSMISSION

[75] Inventor: Atsuhiko Ito, Nagoya, Japan

[73] Assignee: Toyota Jidosha Kogyo Kabushiki Kaisha, Aichi, Japan

[21] Appl. No.: 846,128

[22] Filed: Oct. 27, 1977

[30] Foreign Application Priority Data

Jun. 16, 1977 [JP] Japan ............... 52-71443

[51] Int. Cl.² .............................. F16H 57/10
[52] U.S. Cl. .................................. 192/4 A
[58] Field of Search ..................... 192/4 A, 4 R

[56] References Cited

U.S. PATENT DOCUMENTS

| | | | |
|---|---|---|---|
| 3,523,597 | 8/1970 | Lemieux | 192/4 A |
| 3,684,066 | 8/1972 | Kubo et al. | 192/4 A |
| 3,692,156 | 9/1972 | Week | 192/4 A |
| 3,752,275 | 8/1973 | Mueller | 192/4 A |
| 3,974,720 | 8/1976 | Iijima | 192/4 A X |
| 3,999,462 | 12/1976 | Chamberlain | 192/4 A X |
| 4,103,764 | 8/1978 | Iijima | 192/4 A |
| 4,129,051 | 12/1978 | Shindo et al. | 74/867 |

*Primary Examiner*—Samuel Scott
*Assistant Examiner*—Randall L. Green
*Attorney, Agent, or Firm*—Stevens, Davis, Miller & Mosher

[57] ABSTRACT

An oil pressure control means for operating an automatic transmission for automobiles in a manner to establish various speed shift stages in accordance with the balance of the throttle pressure and the governor pressure, including a combination of a brake-sensitive control means operating in response to operation of a brake pedal and an oil passage change-over means, said combination being adapted to supply the line pressure, in lieu of the throttle pressure, to a speed shift valve which establishes the highest speed stage when the brake pedal is stepped on so as positively to shift the speed shift valve to its downshift position by overriding the balance of the governor pressure and the line pressure.

6 Claims, 2 Drawing Figures

OIL PRESSURE CONTROL MEANS FOR AN AUTOMATIC TRANSMISSION

BACKGROUND OF THE INVENTION

1. Field of the Invention

The present invention relates to an oil pressure control means for an automatic transmission for automobiles and, more particularly, to an improvement of such an oil pressure control means with regard to the speed shift performance in deceleration of automobiles.

2. Description of the Prior Art

In an automatic transmission comprising a fluid torque converter and a reduction gear means including a reduction gear mechanism and a plurality of friction engaging means, the operation of the friction engaging means is changed over in various manners in accordance with variation of the running condition of the vehicle in order to establish constantly the most desirable speed shift stage for the particular running condition of the vehicle. The changing over control of the friction engaging means is effected by an oil pressure control means which incorporates speed shift valves each of which is adapted to shift between two shift positions depending upon the balance of the throttle pressure, which varies in accordance with the amount of the accelerator pedal depression, i.e., the opening of the throttle valve, and the governor pressure, which varies in accordance with the vehicle speed, so that the reduction gear means is set at a selected desirable speed stage depending upon the balance of the throttle pressure and the governor pressure, i.e., the balance of the accelerator pedal depression and the vehicle speed.

Therefore, even when the accelerator pedal is depressed on by a constant amount, if the vehicle speed at the instant is relatively low the throttle pressure is higher than the governor pressure, whereby the reduction gear means is set at a lower speed stage, whereas if the vehicle speed is relatively high the throttle pressure is lower than the governor pressure, whereby the reduction gear means is set at a higher speed stage.

In a conventional automatic transmission adapted to select speed shift stages depending upon the balance of the throttle pressure and the governor pressure, when the automobile is going down a slope or is decelerated from the high speed running condition, the automobile still runs at a relatively high speed with zero throttle opening due to the gravity potential and/or the inertia of the vehicle, and therefore the balance of the governor pressure and the throttle pressure is shifted toward relative gaining of the governor pressure. In this condition, therefore, the automatic transmission is set at the highest speed stage and only poor engine braking performance is available. Particularly, in the case of an automatic transmission incorporating an overdrive means, the transmission will be shifted to the overdrive gear when the automobile is going downhill or is being decelerated from high speed, as for instance in highway use, thereby causing very poor engine braking performance.

SUMMARY OF THE INVENTION

It is therefore the object of the present invention to deal with the aforementioned problem and to provide an improved oil pressure control means for an automatic transmission which is adapted to set a speed shift gear mechanism compulsorily at a speed shift stage which is one stage lower than the highest speed stage when the automobile driving condition has come to require engine braking so as to provide an improved engine braking performance.

In order to accomplish the aforementioned object, the present invention proposes to incorporate a brake-sensitive control means in an oil pressure control means for an automatic transmission, said brake-sensitive control means being adapted to respond to operation of a brake pedal so as to shift one of the speed shift valves which establishes the highest speed stage compulsorily to the downshift side by overriding the balance of the throttle pressure and the governor pressure. However, if such a compulsory downshifting of the highest stage speed shift valve by the brake-sensitive control means is effected every time the brake pedal is stepped on even if the stepping-on operation is quite temporary, too frequent shifting of the highest stage speed shift valve will occur, thereby causing unstable operation of the oil pressure control means. In view of this, the present invention further proposes to incorporate an accelerator-sensitive control means in an oil pressure control means in addition to the aforementioned brake-sensitive control means, wherein said accelerator-sensitive control means senses operation of an accelerator pedal so that it holds the compulsory downshifting of the highest stage speed shift valve as long as the accelerator pedal is released and releases the holding when the accelerator pedal is stepped on.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
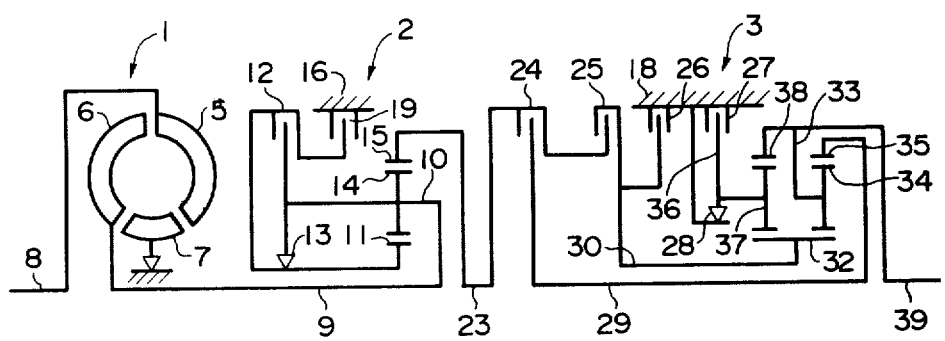
FIG. 1 is a diagrammatical view showing an embodiment of an automatic transmission in which the present invention is incorporated.

In FIG. 1, an example of an automatic transmission incorporating an overdrive means is shown in the form of a diagram for the purpose of simplicity. However, if the more concrete structure of the transmission is required, reference should be made to the specifications and drawings of co-pending patent applications Ser. Nos. 791,575 and 791,576, both being assigned to the same assignee as the present application. The automatic transmission herein shown comprises a fluid torque converter 1, an overdrive means 2, and a reduction gear means 3 for effecting three forward speed stages and one rearward speed stage and is adapted to be controlled by the oil pressure control means shown in FIG. 2. The fluid torque converter 1 is of the conventional well known type including a pump impeller 5, a turbine 6 and a stator 7. The pump impeller 5 is connected with a crank shaft 8 of the engine (not shown) while the turbine 6 is connected with a turbine shaft 9 which forms an output shaft of the fluid torque converter. This output shaft also provides an input shaft of the overdrive means 2, wherein the input shaft is connected with a carrier 10 of a planetary gear mechanism incorporated in the overdrive means. The carrier 10 rotatably supports a plurality of planetary pinions 14 which in turn are engaged with a sun gear 11 and a ring gear 15. A multi-disc clutch 12 and a one-way clutch 13 are provided between the sun gear 11 and the carrier 10 and, further more, a multi-disc brake 19 is provided between the sun gear 11 and the overdrive housing or case 16 enclosing the overdrive means or the planetary gear mechanism.

The ring gear 15 of the overdrive means 2 is connected with an input shaft 23 of the reduction gear means 3. A multi-disc clutch 24 is provided between the input shaft 23 and intermediate shaft 29 while a multi-disc clutch 25 is provided between the input shaft 23 and a sun gear shaft 30. A multi-disc brake 26 is provided between the sun gear shaft 30 and the transmission case 18. The sun gear shaft 30 has a sun gear 32 integrally formed therein, said sun gear meshing with a plurality of first planetary pinions 34 which mesh in turn with a ring gear 35 supported by a carrier 33, thereby forming a first set of a planetary gear mechanism, while the sun gear 32 also meshes with a plurality of second planetary pinions 37 which mesh in turn with a ring gear 38 supported by a carrier 36, thereby forming a second set of a planetary gear mechanism. The ring gear 35 of said first planetary gear mechanism is connected with the intermediate shaft 29, while the carrier 33 thereof is connected with the ring gear 38 of said second planetary gear mechanism. The combination of the carrier 33 and the ring gear 38 is connected with an output shaft 39. A multi-disc brake 27 and a one-way clutch 28 are provided between the carrier 36 of said second planetary gear mechanism and the transmission case 18.

The automatic transmission is controlled by the oil pressure control means explained hereinunder in a manner such that the aforementioned clutches and brakes are engaged or disengaged in order to accomplish various shift conditions among four forward speed stages including an overdrive stage and one rearward drive stage in accordance with the operating of a manual shift lever (not shown) and/or the balance of the engine output power and the vehicle speed.

Table 1 shows the operating condition of the clutches and brakes in various shift conditions.

while it is also conducted through passages 43b and 43c to a throttle pressure regulating valve 45 and a detent pressure regulating valve 46, respectively. The manual shift valve 44 is of the well known type having various shift positions such as parking (P), reverse (R), neutral (N), D range (D), 2 range (2), and L or 1 range (L or 1). The line pressure supplied to the input port 47 of the manual shift valve selectively appears in the output ports 48-51 in accordance with the shift positions of the valve spool thereof. Table 2 shows where the oil pressure appears in the various shift positions:

TABLE 2

| shift position port | P | R | N | D | 2 | L |
|---|---|---|---|---|---|---|
| 48 | | | | O | | O |
| 49 | | | | | O | O |
| 50 | O | O | | | | O |
| 51 | | O | | | | |

The throttle pressure regulating valve 45 generates a throttle pressure at its output port 52, said pressure increasing in accordance with the amount of accelerator pedal depression or the opening of the throttle valve for the engine intake air. The output port 48 of the manual shift valve 44 is connected to the clutch 24 (forward clutch) by way of a passage 48a, and a passage 48b branched from a middle portion of the passage 48a is connected to the input port 54 of a governor valve 53. The governor valve is adapted to regulate the line pressure supplied to the port 54 in accordance with the vehicle speed and to generate a governor pressure $P_{go}$ at its output port 55, said governor pressure increasing as the vehicle speed increases.

56, 57, and 58 designate a 1-2 speed shift valve, a 2-3 speed shift valve and an overdrive control valve (3-overdrive shift valve) respectively. The 1-2 speed shift valve 56 comprises two valve elements 60 and 61 axially opposed to each other with interposition of a compression coil spring 59. The valve element 60 is shifted between the lower shift position (as seen in the figure) as shown by 56A and the upper shift position 56B in accordance with the balance of the sum of the downward driving forces applied by the spring 59 and the throttle

TABLE 1

| Shift Positions | | Fric. Eng. Means | CL 12 | CL 24 | CL 25 | BR 19 | BR 26 | BR 27 | ONE-WAY CL 13 | ONE-WAY CL 28 |
|---|---|---|---|---|---|---|---|---|---|---|
| Parking | | | O | X | X | X | X | O | — | — |
| Reverse | | | O | X | O | X | X | O | LOCK | LOCK |
| Neutral | | | O | X | X | X | X | X | — | — |
| FOR-WARD | D RANGE | 1.st | O | O | X | X | X | X | LOCK | LOCK |
| | | 2.nd | O | O | X | X | X | O | LOCK | OVER-RUN |
| | | 3.rd | O | O | O | X | X | X | LOCK | OVER-RUN |
| | | O.D. | X | O | O | O | X | X | OVER-RUN | OVER-RUN |
| | 2 RANGE | 1.st | O | O | X | X | X | X | LOCK | LOCK |
| | | 2.nd | O | O | X | X | O | X | LOCK | OVER-RUN |
| | L RANGE | | O | O | X | X | O | LOCK | LOCK | |

Wherein O shows that the clutches or brakes are engaged and X shows that the clutches or brakes are disengaged.

Figure 2:
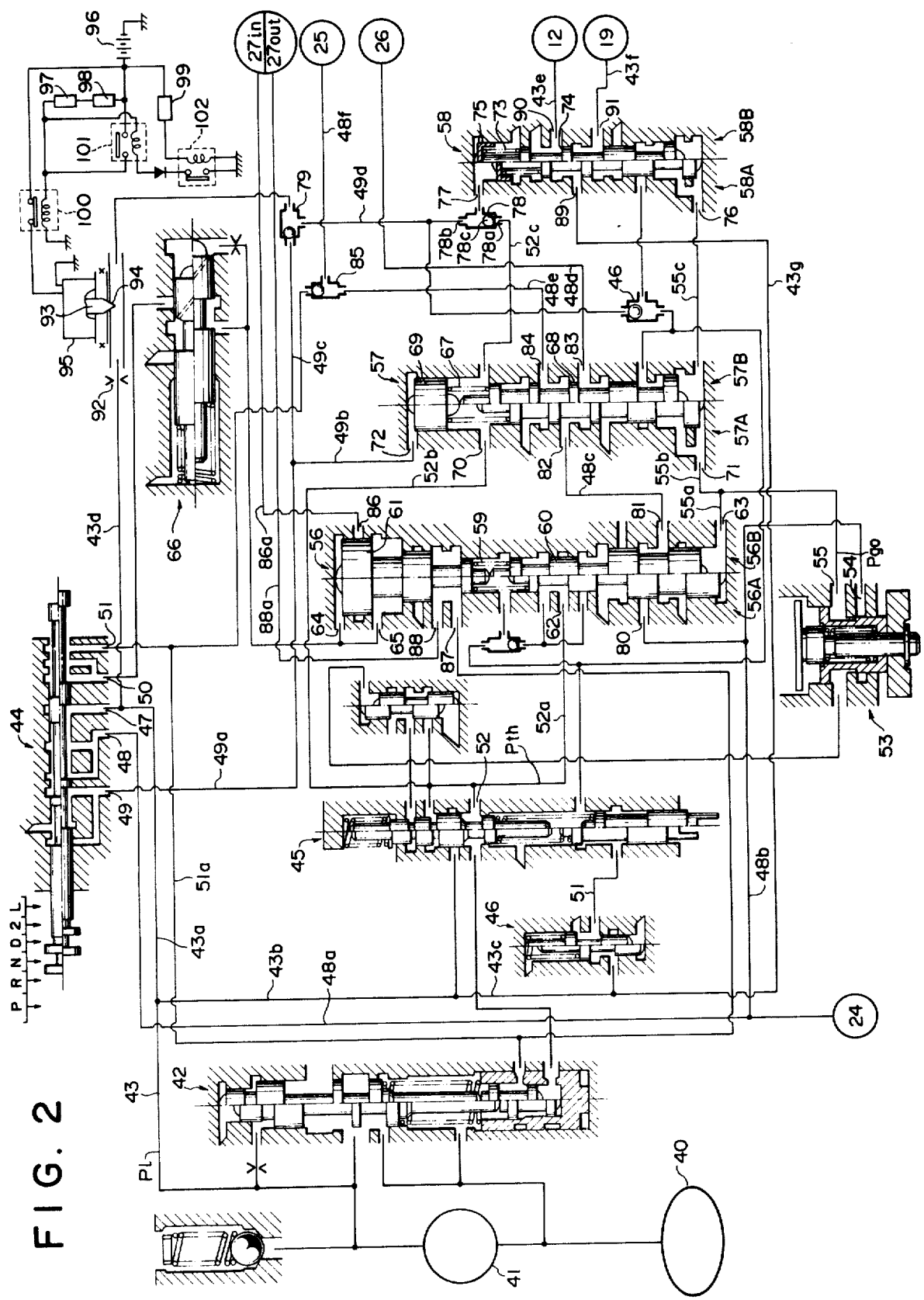
FIG. 2 is a diagram showing an embodiment of the oil pressure control means of the present invention for controlling the automatic transmission shown in FIG. 1.

FIG. 2 is a diagram of the oil pressure control means for operating the automatic transmission shown in FIG. 1, wherein an embodiment of the present invention is incorporated. The oil pumped up by an oil pump 41 from an oil reservoir 40 is supplied to a line pressure regulating valve 42 and generates a regulated line pressure $P_1$ in an oil passage 43. The line pressure is conducted through a passage 43a to a manual shift valve 44 pressure $P_{th}$ supplied to a port 62 through a passage 52a and the upward driving force applied by the governor pressure $P_{go}$ supplied to a port 63 through a passage 55a. Ports 64 and 65 of the 1-2 speed shift valve are supplied with the line pressure which appears at the output port 50 of the manual shift valve 44 when it is shifted to L range, said line pressure being supplied through a low modulator valve 66. When the ports 64 and 65 are supplied with the pressure, the valve element 61 is shifted downward in the figure and compulsorily maintains the valve element 60 at the lower shift position 56A.

The 2-3 speed shift valve 57 similarly comprises two valve elements 68 and 69 axially opposed to each other with interposition of a compression coil spring 67. The valve element 68 is shifted between the lower shift position such as shown by 57A and the upper shift position such as shown by 57B in accordance with the balance of the sum of the downward forces applied by the spring 67 and the throttle pressure $P_{th}$ supplied to a port 70 through a passage 52b and the upward force applied by the governor pressure $P_{go}$ supplied to a port 71 through a passage 55b. A port 72 of the 2-3 speed shift valve is supplied with the line pressure which appears at the output port 49 of the manual shift valve 44 when it is shifted to the 2 range, said pressure being conducted through passages 49a and 49b to the port 72. When this pressure is supplied, the valve element 69 is shifted downward thereby compulsorily maintaining the valve element 68 at the lower shift position 57A.

The overdrive control valve 58 comprises a valve element 74 and a piston element 75 axially opposed to each other with interposition of a compression coil spring 73. The valve element 74 is urged downward by the spring 73 while it is drive upward by the governor pressure $P_{go}$ supplied to a port 76 through a passage 55c when the governor pressure has increased beyond a predetermined value. The port 77 of the overdrive control valve is supplied with either the throttle pressure through a passage 52c and a shuttle valve 78, or the line pressure which appears at the output port 49 of the manual shift valve 44 when it is shifted to 2 or L range, said pressure being conducted through a passage 49c, a shuttle valve 79, a passage 49d and the shuttle valve 78, or the line pressure or a pressure produced from the line pressure in the below mentioned manner to be substantially lower than the throttle pressure, said pressure being conducted through a passage 43d, the suttle valve 79, the passage 49d and the shuttle valve 78. When the throttle pressure supplied to the port 78a of the shuttle valve 78 is higher than the oil pressure supplied to the port 78b of the shuttle valve so that the throttle pressure is supplied to the port 77, the valve element 74 is shifted between the lower and upper shift positions 58A and 58B in accordance with the balance of the throttle pressure and the governor pressure. However, when the line pressure is supplied to the port 78b of the shuttle valve 78, the line pressure, which is higher than the throttle pressure, is introduced into the port 77, whereby the piston 75 is driven downward to the lower shift position such as shown by 58A, whereby the overdrive control valve 58 is compulsorily maintained at the lower shift position 58A regardless of the vehicle speed.

The port 80 of the 1-2 speed shift valve 56 is supplied with the line pressure through the passage 48b when the manual shift valve 44 is shifted to D range. When the 1-2 speed shift valve is in the upper shift position 56B, the line pressure supplied to the port 80 is transmitted to a port 81, wherefrom the pressure is conducted through a passage 48c to a port 82 of the 2-3 speed shift valve 57. When the 2-3 speed shift valve is in the lower shift position 57A, the pressure supplied to the port 82 is transmitted to a port 83, wherefrom the pressure is conducted through a passage 48d, to the brake 26 (second brake). When the 2-3 speed shift valve is in the upper shift position 57B, the pressure supplied to the port 82 is transmitted to a port 84, wherefrom the pressure is conducted through a passage 48e, a shuttle valve 85 and a passage 48f to the clutch 25 (reverse clutch). When the manual shift valve 44 is shifted to L range, the line pressure which appears at the output port 50 is conducted through the low modulator valve 66 to the ports 64 and 65 of the 1-2 speed shift valve 56, thereby driving the valve element 61 downward in the figure, wherefrom the the pressure is conducted through a port 86 and a passage 86a to the inside of the brake 27 (first-/reverse brake) to engage the brake. When the manual shift valve 44 is shifted to R range, the oil pressure which appears at the output port 51 of the manual shift valve is conducted through a passage 51a, ports 87 and 88 of the 1-2 speed shift valve and a passage 88a to the outside of the brake 27 thereby engaging the brake.

The port 89 of the overdrive control valve 58 is supplied with the line pressure through the passages 43b, 43c, and 43g. When the overdrive control valve is in the lower shift position 58A, the line pressure supplied to the port 89 is transmitted to a port 90, wherefrom the pressure is conducted through a passage 43e to the clutch 12 of the overdrive means. When the control valve is shifted to the upper shift position 58B, the oil pressure is transmitted from the port 89 to port 91, wherefrom the pressure is conducted through a passage 43f to the brake 19 of the overdrive means.

A throttling means 92 is provided at a middle portion of the passage 43d and downstream of the throttling means the passage 43f further comprises a drain port 94 controlled by a valve element 93. The valve element 93 is actuated by a solenoid means 95. In the structure diagrammatically shown in the figure, the valve element 93 is constantly urged downward toward the position where it closes the port 94 by a spring not shown in the figure, while it is lifted upward in the figure to open the drain port 94 when the solenoid 95 is energized. The solenoid 95 is controlled by an electric circuit such as shown in the figure.

In the electric circuit, 96 is an electric source which may be the battery mounted in the vehicle. 97 designates an overdrive switch which detects operation of the overdrive means and may be, for example, a pressure switch provided at a middle portion of the passage 43f communicating to the multi-disc brake 19. The overdrive switch 97 is adapted to be closed when the automatic transmission is shifted to the overdrive condition. 98 designates a brake-sensitive means, which detects operation of the brake pedal and may be any of an oil pressure switch mounted to a brake master cylinder, an air switch mounted to a brake booster, a displacement detecting switch or the like mounted to a brake pedal, a push rod, et cetera, and is adapted to be closed when the brake pedal has been stepped on so far as to cause a substantial braking force. 99 designates an accelerator-sensitive means which detects operation of the accelerator pedal and may be a switch mounted on the actuating system for the accelerator pedal. The accelerator-sensitive means 99 is adapted to be closed when the accelerator pedal is released and to be opened when the accelerator pedal is stepped on. 100 designates a normally closed relay having contact points which are closed when its solenoid is not energized and are opened when the solenoid is energized. 101 and 102 designate normally open relays each of which has contacts which are opened when its solenoid is not energized and are closed when the solenoid is energized.

Now let us assume that the vehicle is running at high speed and the automatic transmission has shifted to the overdrive condition. The overdrive switch 97 is therefore closed. If the driver steps on the brake pedal in order to brake the vehicle, the brake-sensitive means 98 is closed. At this time, as a matter of course, the driver releases the accelerator pedal, and therefore the accelerator-sensitive means 99 is closed. When the overdrive switch 97 and the brake-sensitive means 98 are closed, the solenoid of the relay 100 is energized, so the contacts which have been closed before are now opened. Therefore, the solenoid 95 which has been energized before is now de-energized. When the solenoid 95 is de-energized, the valve element 93 is urged by a spring (not shown) toward a position where it closes the port 94. When the port 94 is closed, the line pressure which is constantly supplied through the passage 43d is further transmitted, without leaking out through the port 94, through the shuttle valve 79, passage 49d, and shuttle valve 78 to the port 77 of the overdrive control valve 58. By the supply of line pressure to the port 77, the overdrive control valve 58 is compulsorily shifted to the downshift position 55A regardless of the prevailing balance of the governor pressure and the throttle pressure. Thus the automatic transmission is compulsorily shifted down from the overdrive stage to the 3rd speed stage. If the transmission is shifted down, the overdrive switch 97 is opened. However, prior to this, when the switches 97, 98, and 99 were all closed due to stepping on of the brake pedal and release of the accelerator pedal, the relays 101 and 102 were energized so that the contacts of the relays 101 and 102 were closed, and therefore the circuit for the solenoid of the relay 100 is held in closed condition by the circuit including the relay 101, thereby maintaining the contacts of the relay 100 to be opened even after the overdrive switch 97 has been opened, thereby maintaining the contacts of the relay 100 to be opened even after the overdrive switch 97 has been opened, thereby maintaining the solenoid 95 in de-energized condition. For the same reason, even if the brake pedal is released after it has once been stepped on so that the brake-sensitive switch 98 is again opened, the solenoid of the relay 100 is maintained in energized condition thereby maintaining the solenoid 98 in de-energized condition.

In this manner, when the brake pedal is stepped upon, a braking force is applied to the wheels of the vehicle by the brake mechanism and, at the same time, the transmission is shifted down thereby applying effective engine braking to the vehicle. After the required braking effect has been obtained, if the accelerator pedal is stepped on to accelerate the vehicle, the acceleration-sensitive switch 99 is opened. Therefore, the solenoid of the relay 102 is now de-energized and the contacts thereof are opened. If the contacts of the relay 102 are opened, the solenoid of the relay 101 is de-energized, whereby the contacts thereof are opened and the hold circuit for the relay 100 is now released. Therefore the contacts of the relay 100 are closed and the solenoid 95 is again energized. When the solenoid 95 is energized, the valve element 93 is lifted up from the port 94 which is now opened. If the port 94 is opened, due to the provision of the throttling means 92, the line pressure supplied through the passage 43d is not substantially transmitted to the subsequent system including the shuttle valve 79, passage 49d, etc., and therefore the compulsory downshift action effected through this system to the overdrive control valve 58 is released. In this condition, the overdrive control valve again operates in the usual manner depending upon the balance of the governor pressure and the throttle pressure.

Although the overdrive switch 97 is incorporated in series with the brake-sensitive switch 98 in the embodiment shown in FIG. 2, the overdrive switch 97 may be omitted, if desired.

The oil pressure control means shown in FIG. 2 operates as follows:

D range

When the manual shift valve 44 is shifted to D range the line pressure appears only at the port 48, said pressure being supplied to the clutch 24. If the vehicle is standing or running at a low speed under this condition, the governor pressure generated by the governor valve 53 is so low that the 1-2 speed shift valve 56, the 2-3 speed shift valve 57 and the overdrive control valve 58 are generally shifted to the lower shift positions 56A, 57A, and 58A, respectively. Therefore, the pressure supplied through the passage 48b is blocked at the port 80, whereby the reverse clutch 25 and the second brake 26 connected with the subsequent passages are not supplied with the oil pressure. On the other hand, the oil pressure conducted through the passage 43g to the port 89 of the overdrive control valve 58 is supplied therethrough to the clutch 12 of the overdrive means. In this condition, therefore, the overdrive means is locked and the transmission is in the 1.st speed stage.

In the normal operating condition, when the vehicle speed gradually increases from the above mentioned condition, the governor pressure gradually increases, and when the governor pressure has attained a predetermined value, the 1-2 speed shift valve 56 is shifted to the upper shift position 56B, whereupon the line pressure appears at the port 81 and is conducted therefrom through the ports 82 and 83 of the 2-3 speed shift valve 57 and passages 48d to the second brake 26. Therefore, the transmission is shifted to the 2.nd speed stage.

When the vehicle speed further increases, the 2-3 speed shift valve 57 is also shifted to the upper shift position 57B, whereupon the pressure is transmitted from the port 82 to the port 84, wherefrom the pressure is conducted through the passage 48e to the reverse clutch 25. Therefore, the transmission is shifted to the 3.rd speed stage.

When the vehicle speed further increases, the overdrive control valve 58 is also shifted to the upper shift position 58B, whereupon the pressure supplied to the port 89 is now transmitted to the port 91, wherefrom the pressure is supplied to the brake 19 to engage it. Therefore, the overdrive means is actuated and the overdrive condition is attained.

Although the changing-over operation of the transmission has been explained in the above with regard to the case wherein the vehicle speed gradually increases, it should of course be noted that the changing-over of the transmission is effected depending upon the balance of the governor pressure and the throttle pressure acting upon the valve elements of individual shift valves, and, therefore, the changing-over point varies not only in accordance with the vehicle speed but also in accordance with the accelerator pedal depression. Conversely, when the vehicle speed gradually decreases from a high speed, the overdrive control valve 58, the 2-3 speed shift valve 57 and the 1-2 speed shift valve 56 are successively shifted from 58B to 58A, 57B to 57A, and 56B to 56A respectively, thereby accomplishing the corresponding change-over of the transmission speed stages.

However, if the accelerator pedal is released while the brake pedal is slightly stepped on during high-speed running of the vehicle, as in the case that the vehicle is going down a slope or is temporarily decelerated while it is running at high speed as on a highway, the throttle valve is fully closed while the vehicle speed is relatively high, whereby the governor pressure becomes so high relative to the throttle pressure that the 1-2 speed shift valve 56, the 2-3 speed shift valve 57 and the overdrive control valve 58 are set at shift positions 56B, 57B, and 58B respectively to establish the highest speed stage, thereby rendering poor engine brake performance. However, when the present invention is incorporated in the oil pressure control means, as has been previously explained, if the accelerator pedal is released and the brake pedal is stepped on, the highest stage speed shift valve, i.e., the overdrive control valve 58, is compulsorily and positively shifted down to a position 55A so that the overdrive means is shut down to make the transmission operate in the 3.rd speed stage in which more favorable engine braking is obtained.

In this connection, if the atuomatic transmission does not include any overdrive means so that the highest speed stage is the direct connection stage, the control system including the elements 92-102 may of course similarly be incorporated in the oil pressure control circuit for the 2-3 speed shift valve so that the automatic transmission is compulsorily shifted to the 2.nd speed stage when the brake pedal is stepped upon.

2 Range

When the manual shift valve 44 is shifted to 2 range, the line pressure appears at the port 48 as well as at the port 49, wherefrom the pressure is conducted through the passages 49a and 49b to the port 72 of the 2-3 speed shift valve 57 while the pressure is also conducted through the passage 49c, the shuttle valve 79, the passage 49d and the shutttle valve 78 to the port 77 of the overdrive control valve 58, thereby compulsorily maintaining these valves at the lower shift positions 57A and 58A, respectively. Under this condition, therefore, the overdrive means is positively maintained in the locked condition, while the transmission operates either in the 1.st speed stage or the 2.nd speed stage.

L range

When the manual shift valve 44 is shifted to L range, the line pressure also appears at the output port 50, wherefrom the pressure is conducted through the low modulator valve 66 to the ports 64 and 65 of the 1-2 speed shift valve 56 thereby compulsorily maintaining the valve at the lower shift position 56A. Under this condition, the transmission is fixed in the 1.st speed stage.

From the foregoing, it will be appreciated that the present invention provides an oil pressure control means for an automatic transmission which guarantees high safety operation of vehicles with regard to the braking performance in high speed or downhill running condition by ensuring effective engine braking in these operating conditions.

Although the invention has been shown and described with respect to a preferred embodiment thereof, it should be understood by those skilled in the art that various changes and omissions of the form and detail thereof may be made therein without departing from the scope of the invention.

I claim:

1. An oil pressure control means for an automatic transmission which comprises a fluid torque converter and a speed shift gear means including a speed shift gear mechanism and a plurality of friction engaging means, said oil pressure control means comprising a source of oil pressure, a line pressure regulating valve which generates a line pressure from the oil pressure of said source, a throttle pressure regulating valve which generates a throttle pressure corresponding to the throttle opening, a governor valve which generates a governor pressure corresponding to the vehicle speed, a manual shift valve for shifting speed ranges, a plurality of speed shift valves which change over the supply of oil pressure to said friction engaging means of said speed shift gear means depending upon the balance of said throttle pressure and said governor pressure, and a brake-sensitive control means including a brake-sensitive means for sensing operation of a brake pedal and adapted to shift one of said speed shift valves which establishes the highest speed stage compulsorily to the downshift side by overriding the balance of said throttle pressure and said governor pressure when said brake-sensitive means has sensed operation of the brake pedal, said brake-sensitive control means further including a drain port which opens a middle portion of a passage conducting the line pressure to a drain passage and a solenoid valve which selectively opens or closes said drain port.

2. The oil pressure control means of claim 1, wherein said brake-sensitive control means includes an oil passage control means adapted to be conductive for the line pressure therethrough when said brake-sensitive means has sensed operation of the brake pedal and to be substantially interceptive for the line pressure therethrough when said brake-sensitive means does not sense operation of the brake pedal, and an oil passage change-over means which supplies the line pressure conducted through said brake-sensitive control means to said one speed shift valve which establishes the highest speed stage in lieu of the throttle pressure when said oil passage control means is conductive.

3. The oil pressure control means of claim 1, wherein said one speed shift valve is an overdrive control valve which is constantly supplied with the line pressure and changes over the line pressure between two output systems, one effecting the de-activation of an overdrive means while the other effects operation of the overdrive means.

4. The oil pressure control means of claim 1, wherein said solenoid valve is operated by an electric circuit including said brake-sensitive means.

5. The oil pressure control means of claim 1, wherein said brake-sensitive control means further comprises an accelerator-sensitive means which holds the downshift condition of said one speed shift valve until an accelerator pedal is stepped on.

6. The pressure control means of claim 1, wherein said solenoid valve is operated by an electric circuit including said brake-sensitive means and said accelerator-sensitive means, said electric circuit being adapted to have a first condition of making said solenoid valve open said drain port and a second condition of making said valve close said drain port, said brake-sensitive means providing said second condition of said electric circuit when it senses operation of the brake pedal while it provides said first condition of said electric circuit when it senses non-operation of the brake pedal, said electric circuit further including a holding circuit which holds said second condition of said electric circuit in co-operation with said accelerator-sensitive means which is sensing non-operation of the accelerator pedal when said brake-sensitive means has once sensed operation of the brake pedal, said accelerator-sensitive means releasing said holding circuit when it senses operation of the accelerator pedal.

* * * * *